(12) United States Patent
Ino et al.

(10) Patent No.: US 8,955,497 B2
(45) Date of Patent: Feb. 17, 2015

(54) AIR INTAKE DEVICE

(75) Inventors: Masao Ino, Toyota (JP); Osamu Sato, Takahama (JP); Yoshiaki Yamamoto, Anjo (JP)

(73) Assignee: Denso Corporation, Kariya (JP)

( * ) Notice: Subject to any disclaimer, the term of this patent is extended or adjusted under 35 U.S.C. 154(b) by 271 days.

(21) Appl. No.: 13/426,652

(22) Filed: Mar. 22, 2012

(65) Prior Publication Data

US 2012/0255513 A1    Oct. 11, 2012

(30) Foreign Application Priority Data

Apr. 5, 2011    (JP) .................................... 2011-83777

(51) Int. Cl.
*F02B 29/04*    (2006.01)

(52) U.S. Cl.
USPC ...................................... 123/542; 123/184.24

(58) Field of Classification Search
USPC .......... 123/542, 563, 184.21–184.61
IPC ........... F02B 29/04, 29/0406, 29/0437, 29/0443, F02B 29/0462, 29/0475; F01P 2060/02; F02M 35/112, 35/10026
See application file for complete search history.

(56) References Cited

U.S. PATENT DOCUMENTS

| | | | | |
|---|---|---|---|---|
| 6,293,264 | B1* | 9/2001 | Middlebrook | 123/563 |
| 7,469,690 | B1* | 12/2008 | Kavadeles | 123/559.1 |
| 2004/0206340 | A1* | 10/2004 | Bilek et al. | 123/563 |
| 2007/0199535 | A1* | 8/2007 | Shinada et al. | 123/184.57 |
| 2008/0115755 | A1* | 5/2008 | Hayman | 123/184.47 |
| 2009/0084364 | A1* | 4/2009 | Martins et al. | 123/563 |
| 2009/0229557 | A1 | 9/2009 | Abe et al. | |
| 2010/0077996 | A1* | 4/2010 | Pantow et al. | 123/557 |

FOREIGN PATENT DOCUMENTS

| | | |
|---|---|---|
| DE | 10332989 | 4/2004 |
| JP | 08-291715 | 11/1996 |
| JP | 2001-248448 | 9/2001 |
| JP | 2007-138904 | 6/2007 |

OTHER PUBLICATIONS

Office Action (2 pages) dated May 10, 2013, issued in corresponding Japanese Application No. 2011-083777 and English translation (2 pages).

Chinese Second Office Action and Search Report issued in corresponding Chinese Application No. 2012100977347 dated Aug. 15, 2014 (with translation).

Office Action (6 pages) dated Jan. 20, 2014, issued in corresponding Chinese Application No. 201210097734.7 and English translation (6 pages).

* cited by examiner

*Primary Examiner* — M. McMahon
(74) *Attorney, Agent, or Firm* — Nixon & Vanderhye P.C.

(57) ABSTRACT

An air intake device includes a cooler and a surge tank accommodating the cooler. The air intake device is to be connected to a cylinder head of an engine. The cylinder head includes an intake port that accommodates an intake valve. The cooler has a refrigerant passage through which refrigerant flows and an air passage through which intake air flows. The surge tank has a connector connected to the cylinder head. The cooler has a protrusion protruding from the connector toward the intake valve.

8 Claims, 8 Drawing Sheets

AIR INTAKE DEVICE

CROSS REFERENCE TO RELATED APPLICATION

This application is based on Japanese Patent Application No. 2011-83777 filed on Apr. 5, 2011, the disclosure of which is incorporated herein by reference in its entirety.

TECHNICAL FIELD

The present disclosure relates to an air intake device.

BACKGROUND

DE10332989A1 describes an air intake system having a surge tank that introduces intake air to each cylinder of an engine, and a cooler is arranged in the surge tank. The air intake system enables intake air compressed by a turbocharger to be cooled at a place comparatively close to the engine.

However, while the intake air is cooled by an intercooler corresponding to the cooler, the cooled air receives heat from the engine or engine compartment located downstream of the intercooler, so that the temperature of the intake air may be raised again. If the temperature of the intake air is raised again, the turbocharging effect of the turbocharger is lowered.

Further, if an internal exhaust gas recirculation (EGR) device is used in the air intake system, exhausted high-temperature gas is again drawn into the cylinder of the engine. In this case, knocking may be generated, so that it is difficult to introduce a large amount of exhausted gas through the internal EGR device.

SUMMARY

It is an object of the present disclosure to provide an air intake device in which intake air is restricted from having temperature increasing.

According to an example of the present disclosure, an air intake device that is connected to a cylinder head of an engine includes a surge tank and a cooler. The cylinder head includes an intake port that accommodates an intake valve. The surge tank has a main part and a connector. The main part defines an accommodation space that communicates with an intake passage of the intake port. The connector is connected to the cylinder head. The cooler is accommodated in the accommodation space, and has a refrigerant passage through which refrigerant flows and an air passage through which an intake air flows. The cooler cools the intake air by the refrigerant, and has a protrusion protruding from the connector toward the intake valve.

Accordingly, the cooled intake air is restricted from having temperature increasing. Specifically, a distance between the intake valve and an end of the cooler opposing to the intake valve can be made shorter. Thus, the intake air cooled by the cooler is restricted from being reheated by the engine. Further, the volume of the intake air is restricted from expanding, and the response speed is restricted from being lowered. Furthermore, when the intake valve is opened, the returned exhaust gas can be cooled, so that a large amount of EGR gas can be introduced using the internal EGR device, which is less expensive than an external EGR device, and knocking can be restricted.

According to an example of the present disclosure, the protrusion is one of a plurality of protrusions. When the air intake device is mounted to the cylinder head having a plurality of intake ports, the plurality of protrusions project correspondingly to the plurality of intake ports, respectively. Therefore, the temperature of the intake air is restricted from increasing by the heat of the intake port.

According to an example of the present disclosure, the cooler is one of a plurality of coolers. The cooling efficiency of the cooler can be raised because the refrigerant passages of the coolers are independent from each other. Thus, the temperature of the intake air is restricted from increasing more effectively.

According to an example of the present disclosure, the refrigerant passage is configured to extend to an end of the cooler opposing to the intake valve. Therefore, the refrigerant flowing through the refrigerant passage can reach the end of the cooler opposing to the intake valve. Thus, the intake air can be cooled using up to the end of the cooler opposing to the intake valve. Accordingly, the cooling ability of the cooler can be raised.

According to an example of the present disclosure, the refrigerant passage has a forward passage and a backward passage. Refrigerant flows toward the intake valve in the forward passage, and flows away from the intake valve in the backward passage. Therefore, in the same protrusion, the temperature of the refrigerant in the forward passage is higher than the temperature of the refrigerant in the backward passage, so that the cooling efficiency of the refrigerant can be raised.

According to an example of the present disclosure, a flow rate controller that controls an amount of the intake air flowing through the intake passage is located opposite from the intake valve through the cooler. The flow rate controller may be a tumble control valve or swirl control valve. The flow of the intake air is controlled by controlling the opening of the tumble control valve or swirl control valve, so that tumble flow or swirl flow can be generated.

According to an example of the present disclosure, the air passage of the cooler is separated into a first part and a second part in a direction perpendicular to a flowing direction of the intake air, and the first part has a first passage area larger than a second passage area of the second part. Therefore, tumble flow can be generated by adjusting the arrangement direction of the first part and the second part.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
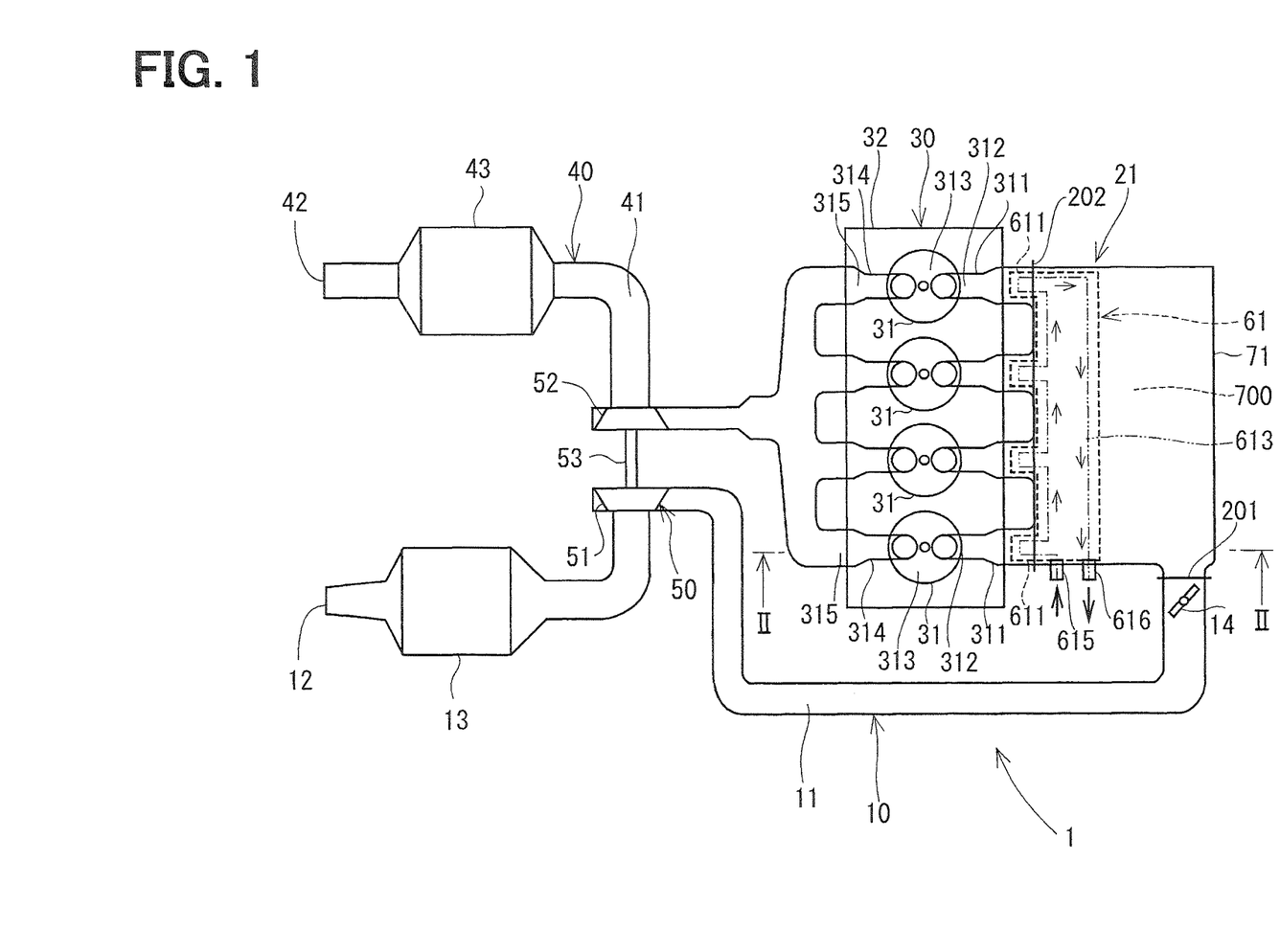
FIG. 1 is a schematic view illustrating an air intake system including an air intake device according to a first embodiment.

An air intake device 21 according to a first embodiment is applied to an engine system 1 of a vehicle, for example. As shown in FIG. 1, the engine system 1 is equipped with an inlet pipe 10, the air intake device 21, an engine 30, an exhaust pipe 40, and a turbocharger 50.

An inlet passage 11 is defined inside of the inlet pipe 10. An inlet port 12 is defined at a first end of the inlet pipe 10. An air filter 13 is provided in the inlet pipe 10 adjacent to the inlet port 12. The air filter 13 collects foreign matters contained in intake air.

The intake device 21 is arranged to a second end of the inlet pipe 10. A throttle valve 14 is arranged in the inlet passage 11 before the intake device 21. The throttle valve 14 controls an amount of the intake air supplied to the engine 30 by opening/closing the inlet passage 11. The throttle valve 14 corresponds to a flow rate controller that controls an amount of the intake air.

The intake device 21 has a surge tank 71 and an intercooler 61. A first end of the surge tank 71 is connected with the inlet pipe 10, and a second end of the surge tank 71 is connected with the engine 30. The surge tank 71 and the intercooler 61 will be explained in detail later. The intercooler 61 corresponds to a cooler.

The engine 30 has four cylinders 31, and each of the cylinders 31 has a combustion chamber 313 inside. The engine 30 has a cylinder head 32 that closes one end of the cylinder 31. The cylinder head 32 has four intake ports 311 correspondingly to the four cylinders 31. An intake passage 312 is defined inside of the intake port 311. The intake passage 312 communicates with the combustion chamber 313 of the cylinder 31. A discharge port 314 is arranged at the other end of the cylinder 31 opposite from the intake port 311. A discharge passage 315 is defined inside of the discharge port 314. The discharge passage 315 communicates with the combustion chamber 313.

Figure 2:
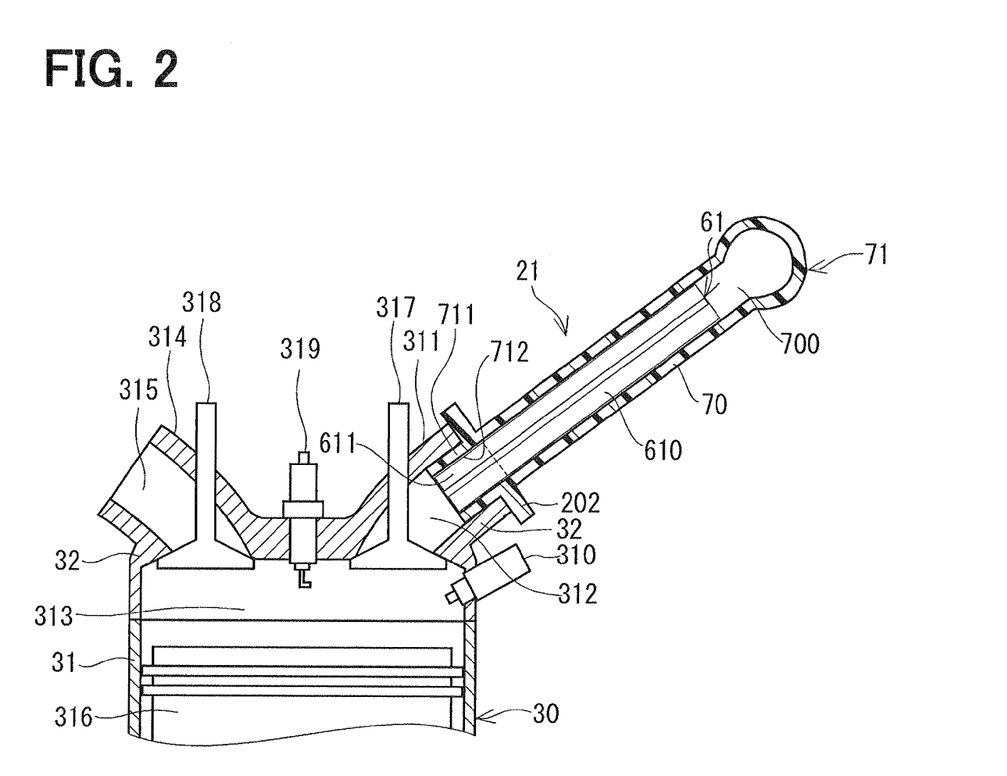
FIG. 2 is a sectional view taken along ling II-II of FIG. 1.

As shown in FIG. 2, a piston 316 is arranged in the combustion chamber 313 to reciprocate in an axis direction of the cylinder 31. An intake valve 317, an exhaust valve 318, an injector 310, and an ignition plug 319 are provided in the cylinder head 32. The intake valve 317 opens/closes a space between the combustion chamber 313 and the intake passage 312. The exhaust valve 318 opens/closes a space between the combustion chamber 313 and the discharge passage 315. The injector 310 injects gasoline as a fuel to the combustion chamber 313. The ignition plug 319 ignites the gasoline in the combustion chamber 313. Thus, the engine 30 works by combusting the gasoline injected from the injector 310 in the combustion chamber 313. The engine 30 is four-cylinder direct-injection type gasoline engine, for example.

When the piston 316 moves downward in the combustion chamber 313, a pressure difference is generated between the combustion chamber 313 and the intake passage 312. At this time, gas (air) of the intake passage 312 is drawn into the combustion chamber 313. The gas drawn into the combustion chamber 313 is called as "intake air".

As shown in FIG. 1, the exhaust pipe 40 is connected to the discharge port 314 of the engine 30. An end of the exhaust pipe 40 adjacent to the discharge port 314 is branched to four parts, and each branched part is connected to the discharge port 314. The other end of the exhaust pipe 40 opposite from the discharge port 314 has an exhaust port 42. An exhaust passage 41 is defined inside of the exhaust pipe 40. Combustion gas is generated by the combustion of gasoline in the combustion chamber 313, and is discharged from the combustion chamber 313. The discharged combustion gas flows through the discharge port 314 and the exhaust passage 41, and flows out of the vehicle through the exhaust port 42. The combustion gas produced by the combustion of gasoline in the combustion chamber 313 is called as "exhaust gas".

A cleaner 43 is provided in the exhaust pipe 40 adjacent to the exhaust port 42. The cleaner 43 includes a monolith ternary catalyst, for example. The exhaust gas is cleaned while passing through the cleaner 43.

The turbocharger 50 is positioned between the inlet pipe 10 and the exhaust pipe 40. The turbocharger 50 has a turbine 52, a compressor 51, and a shaft 53. The turbine 52 is rotatably arranged in the exhaust passage 41 and is positioned between the engine 30 and the cleaner 43. The compressor 51 is rotatably arranged in the inlet passage 11 and is positioned between the air filter 13 and the throttle valve 14. The shaft 53 connects the turbine 52 and the compressor 51 with each other.

When exhaust gas flows through the exhaust passage 41, the turbine 52 is rotated, and the compressor 51 is rotated. When the compressor 51 is rotated, intake air is compressed by the compressor 51 and the compressed air is supplied to the engine 30. That is, the turbocharger 50 supercharges the intake air for the engine 30. A temperature of the intake air compressed by the compressor 51 is raised before the engine 30, compared with intake air located adjacent to the air filter 13 before the compressor 51.

Figure 3:
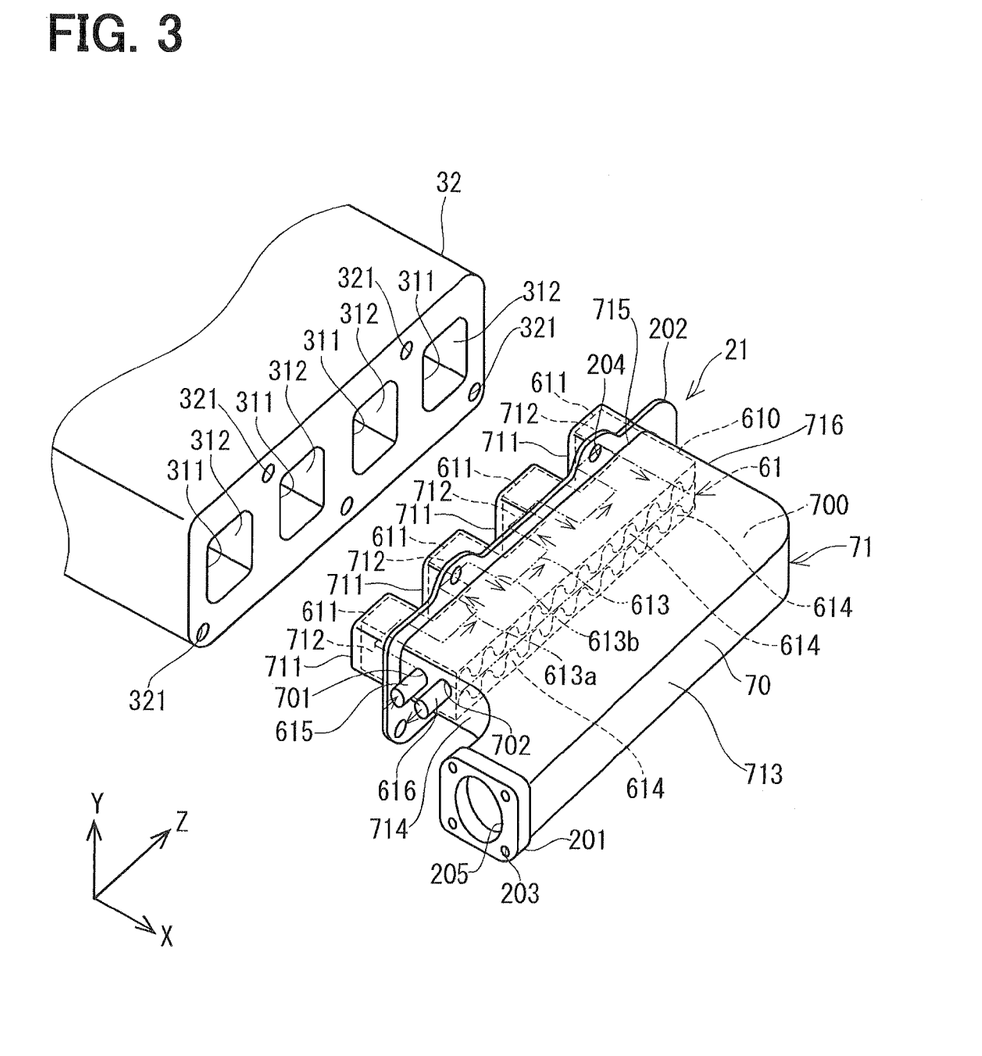
FIG. 3 is a perspective view illustrating the air intake device of the first embodiment.

The surge tank 71 and the intercooler 61 will be explained in detail with reference to FIG. 3. The surge tank 71 has a tank main part 70, a first flange 201, a second flange 202, and four guide parts 711, as shown in FIG. 3.

The main part 70 has an approximately rectangular shape, and has a first long side 713, a second long side 715, a first short side 714, and a second short side 716. An accommodation space 700 is defined inside of the main part 70. The first short side 714 of the main part 70 has holes 701, 702. A longitudinal direction of the main part 70 is defined as a direction of Z, and a minor (short) direction of the main part 70 is defined as a direction of X. A direction perpendicular to the direction of X and the direction of Z is defined as a direction of Y, in FIG. 3.

The first flange 201 has an approximately rectangular board shape. The first flange 201 is arranged on the first short side 714 of the main part 70, and is located adjacent to the first long side 713. The first flange 201 has an opening 205 at the center, and the opening 205 communicates with the accommodation space 700. The first flange 201 has plural screw holes 203. When the inlet pipe 10 is connected with the first flange 201, the inlet passage 11 of the inlet pipe 10 communicates with the accommodation space 700 via the opening 205.

The second flange 202 has an approximately rectangular board shape. The second flange 202 is arranged on the second long side 715 of the main part 70. The second flange 202 has plural screw holes 204. The plural holes 204 correspond to plural holes 321 of a surface of the cylinder head 32 opposing to the second flange 202, respectively. The second flange 202 may correspond to a connector.

The four guide parts 711 are disposed to the second flange 202, and are located opposite from the main part 70 through the second flange 202. The guide part 711 defines a guide passage 712 inside, and the guide passage 712 communicates with the accommodation space 700. The four guide parts 711 are configured to be inserted into the four intake ports 311. When the guide part 711 is inserted into the intake port 311, the guide passage 712 and the intake passage 312 communicate with each other.

The intercooler 61 is accommodated in the accommodation space 700 of the surge tank 71, and is located adjacent to the second long side 715. The intercooler 61 has a main part 610 and four protrusions 611 protruding from the main part 610. The main part 610 has an approximately rectangular shape. The four protrusions 611 are configured to be inserted into the guide passages 712 of the guide parts 711, respectively.

The intercooler 61 has a refrigerant passage 613 through which refrigerant flows, and an air passage 614 through which intake air flows. A first end of the refrigerant passage 613 defines a supply port 615, and a second end of the refrigerant passage 613 defines an outlet port 616. The refrigerant passage 613 is formed to extend to an end of the projection 611 opposite from the main part 610. The supply port 615 and the outlet port 616 are projected outward from the main part 70 via the hole 701 and the hole 702, respectively.

The refrigerant passage 613 located in the projections 611 has a forward passage 613a and a backward passage 613b. Refrigerant in the forward passage 613a flows in a direction away from the main part 610, and refrigerant in the backward passage 613b flows in a direction toward the main part 610. That is, the refrigerant in the forward passage 613a flows from the main part 610 toward the intake valve 317, and the refrigerant in the backward passage 613b flows from the tip end of the projection 611 toward the main part 610. Refrigerant flows opposite directions between the forward passage 613a and the backward passage 613b.

The air passage 614 is located adjacent to the refrigerant passage 613. Intake air flowing through the air passage 614 and refrigerant flowing through the refrigerant passage 613 exchange heat with each other. While the refrigerant supplied from the supply port 615 flows through the forward passage 613a and the backward passage 613b of the four protrusions 611, the refrigerant exchanges heat with the intake air flowing through the air passage 614 so that the temperature of the refrigerant is raised. The refrigerant having high-temperature is discharged from the outlet port 616.

According to the first embodiment, the protrusion 611 of the intercooler 61 is shaped to protrude into the guide passage 712 of the guide part 711, as shown in FIG. 2. When the guide part 711 is inserted to the intake port 311, the protrusion 611 protrudes into the intake passage 312 of the intake port 311. Therefore, a distance between the intake valve 317 and an end of the intercooler 61 opposing to the intake valve 317 can be made shorter. Thus, the intake air cooled by the intercooler 61 is restricted from being reheated in the intake port 311. Further, the volume of the intake air is restricted from expanding, and the response speed is restricted from being lowered. Furthermore, when the intake valve 317 is opened, returned exhaust gas can be cooled, so that a large amount of EGR gas can be introduced through the internal EGR device.

According to the first embodiment, the refrigerant passage 613 is shaped to extend to the tip end of the protrusion 611 opposite form the main part 610. Therefore, refrigerant flowing through the refrigerant passage 613 can reach the end of the intercooler 61 opposing to the intake valve 317. Thus, the intake air can be cooled in the area up to the end of the intercooler 61 opposing to the intake valve 317. Accordingly, the cooling ability of the intercooler 61 can be raised.

According to the first embodiment, the refrigerant passage 613 located in the protrusion 611 has the forward passage 613a and the backward passage 613b. Refrigerant in the forward passage 613a flows in a direction away from the main part 610, and refrigerant in the backward passage 613b flows in a direction toward the main part 610. Therefore, in the same protrusion 611, the temperature of the refrigerant in the forward passage 613a is lower than the temperature of the refrigerant in the backward passage 613b. Further, because the refrigerant passage 613 is made longer, the contact area between the air passage 614 and the refrigerant passage 613 can be increased. Thus, the cooling efficiency of the refrigerant can be raised.

Second Embodiment

An air intake device 22 according to a second embodiment will be described with reference to FIG. 4. In the second embodiment, approximately the same component as the first embodiment has the same reference numeral, and the redundant explanation is omitted.

Figure 4:
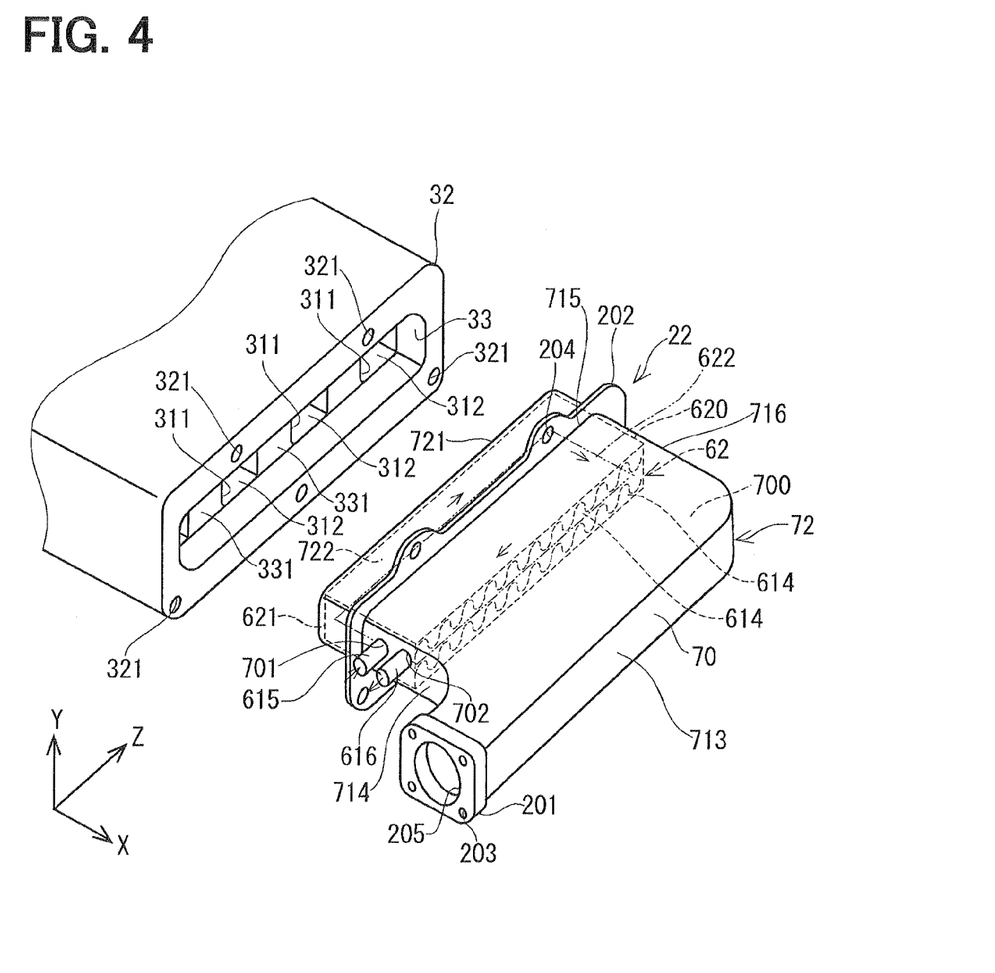
FIG. 4 is a perspective view illustrating an air intake device according to a second embodiment.

As shown in FIG. 4, the air intake device 22 has a surge tank 72 and an intercooler 62.

The surge tank 72 has a tank main part 70, a first flange 201, a second flange 202, and a single guide part 721. The guide part 721 is disposed to the second flange 202, and is located opposite from the main part 70 through the second flange 202. The guide part 721 has an approximately rectangular shape, and defines a guide passage 722 inside. The guide passage 722 communicates with the accommodation space 700.

The intercooler 62 has a main part 620 and a protrusion 621. The main part 620 has an approximately rectangular shape, and is accommodated in the accommodation space 700 of the surge tank 72. The protrusion 621 protrudes from the main part 620 into the guide passage 722 of the guide part 721. The protrusion 621 has an approximately rectangular shape.

The intercooler 62 has a refrigerant passage 622 through which refrigerant flows, and an air passage 614 through which intake air flows. A first end of the refrigerant passage 622 defines a supply port 615, and a second end of the refrigerant passage 622 defines an outlet port 616.

In the second embodiment, the cylinder head 32 has an end surface to be connected to the surge tank 72, and the end surface of the cylinder head 32 has a recess 33. The four intake ports 311 opens on a bottom 331 of the recess 33. When the cylinder head 32 and the surge tank 72 are connected with each other, the guide part 721 is received by the recess 33, and the guide passage 722 and the intake ports 311 communicate with each other. Therefore, the protrusion 621 of the intercooler 62 communicates with all the four intake ports 311, so that the intake air cooled by the intercooler 62 is supplied to the intake ports 311.

According to the second embodiment, the intercooler 62 has the protrusion 621 that is connectable to all the intake ports 311. Further, the protrusion 621 has approximately rectangular shape. Therefore, a method of producing the intercooler 62 is made easy and simple compared with the first embodiment. Moreover, the second embodiment achieves the same advantages of the first embodiment.

Third Embodiment

An air intake device 23 according to a third embodiment will be described with reference to FIG. 5. In the third embodiment, approximately the same component as the second embodiment has the same reference numeral, and the redundant explanation is omitted.

Figure 5:
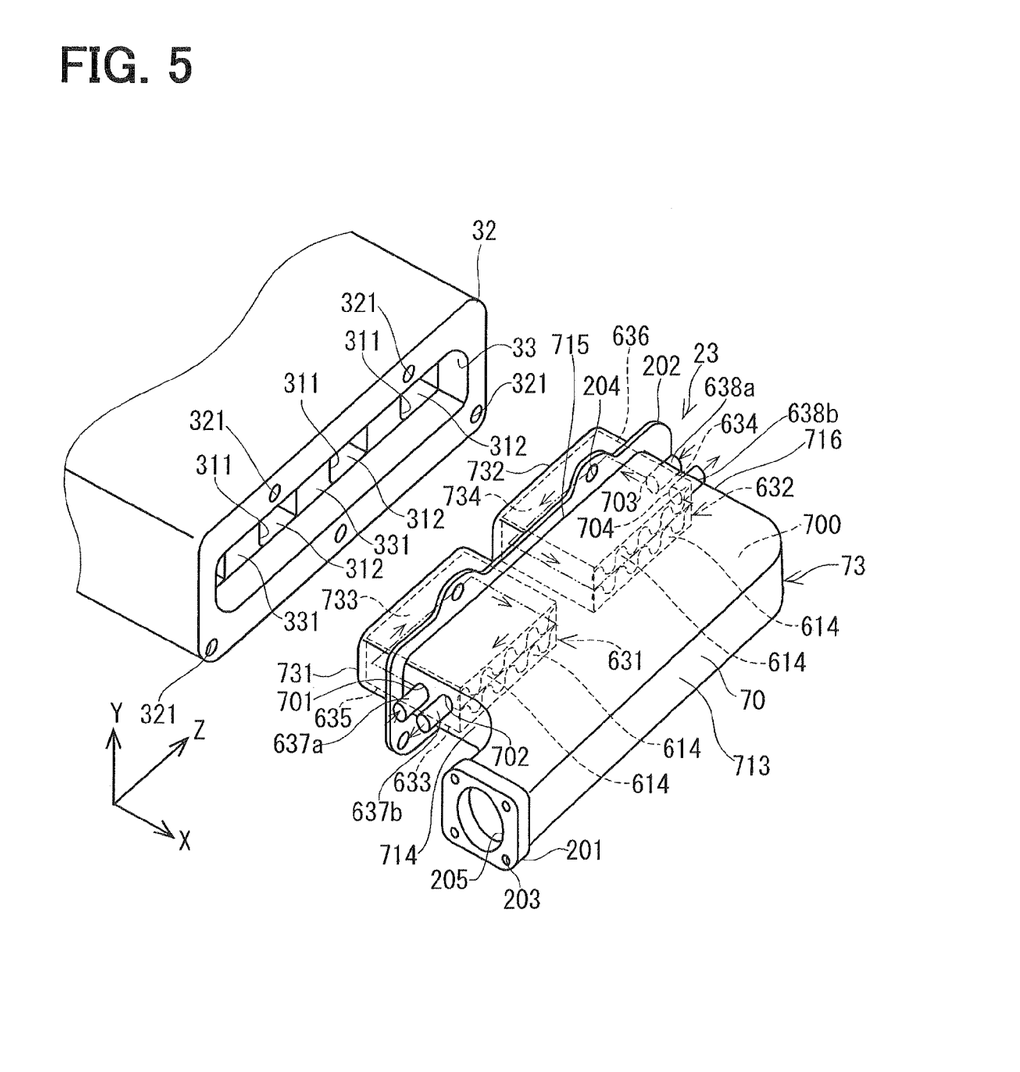
FIG. 5 is a perspective view illustrating an air intake device according to a third embodiment.

As shown in FIG. 5, the air intake device 23 has a surge tank 73, a first intercooler 631, and a second intercooler 632. The surge tank 73 has a tank main part 70, a first flange 201, a second flange 202, a first guide part 731, and a second guide part 732.

The first guide part 731 and the second guide part 732 are disposed to the second flange 202, and are located opposite from the main part 70 through the second flange 202. The first guide part 731 and the second guide part 732 are disposed to the second long side 715, and are arranged in the direction of Z. The first guide part 731 and the second guide part 732 have an approximately rectangular shape, and define a first guide passage 733 and a second guide passage 734, respectively. The guide passage 733, 734 communicates with the accommodation space 700. The first guide part 731 corresponds to two of the intake ports 311, and the second guide part 732 corresponds to the other two of the intake ports 311.

The first intercooler 631 has a first main part 633 and a first protrusion 635. The main part 633 is accommodated in the accommodation space 700 of the surge tank 73. The first protrusion 635 protrudes from the main part 633 into the first guide passage 733.

The intercooler 631 has a first supply port 637a, a first outlet port 637b, and a first refrigerant passage 637 that connects the ports 637a, 637b with each other. The first supply port 637a and the first outlet port 637b are projected outward from the main part 70 via the hole 701 and the hole 702 defined in the first short side 714, respectively.

The second intercooler 632 has a second main part 634 and a second protrusion 636. The main part 634 is accommodated in the accommodation space 700 of the surge tank 73. The second protrusion 636 protrudes from the main part 634 into the second guide passage 734.

The second intercooler 632 has a second supply port 638a, a second outlet port 638b, and a second refrigerant passage 638 that connects the ports 638a, 638b with each other. The second supply port 638a and the second outlet port 638b are projected outward from the main part 70 via a hole 703 and a hole 704 defined in the second short side 716, respectively.

Refrigerant circulates in the first intercooler 631 and the second intercooler 632 independently from each other.

In the third embodiment, when the cylinder head 32 and the surge tank 73 are connected with each other, the first guide part 731 and the second guide part 732 are received by the recess 33. The first guide passage 733 communicates with two of the intake ports 311, and the second guide passage 734 communicates with the other two of the intake ports 311. Therefore, the intake air cooled by the first intercooler 631 and the second intercooler 632 is supplied to the intake ports 311.

According to the third embodiment, the first intercooler 631 and the second intercooler 632 are independent from each other. The refrigerant passage of the first intercooler 631 and the refrigerant passage of the second intercooler 632 are independent from each other. Therefore, the cooling ability can be restricted from having variation relative to the four intake ports 311. Further, the cooling effect of the intake air can be much raised.

Fourth Embodiment

An air intake device 24 according to a fourth embodiment will be described with reference to FIG. 6. In the fourth embodiment, approximately the same component as the third embodiment has the same reference numeral, and the redundant explanation is omitted.

Figure 6:
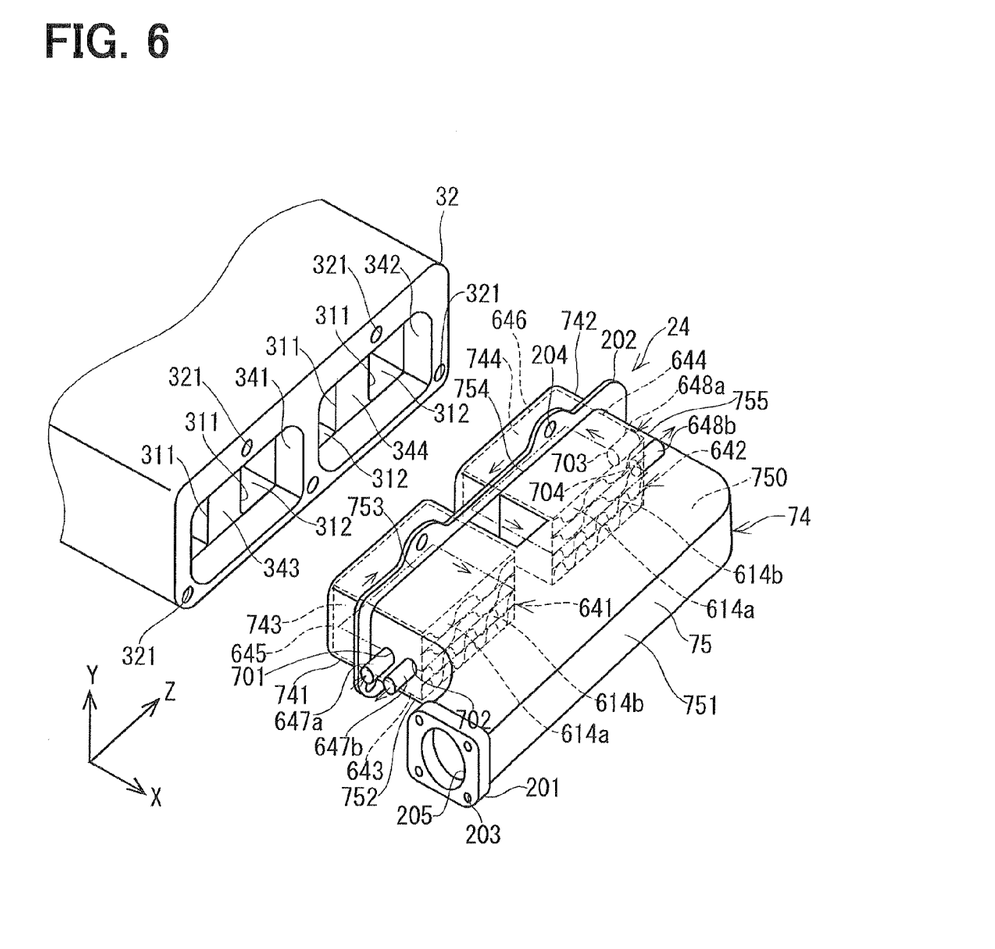
FIG. 6 is a perspective view illustrating an air intake device according to a fourth embodiment.

As shown in FIG. 6, the air intake device 24 has a surge tank 74, a first intercooler 641, and a second intercooler 642. The surge tank 74 has a tank main part 75, a first flange 201, a second flange 202, a first guide part 741, and a second guide part 742.

The tank main part 75 has an approximately U-shape when seen in the direction of Y, and has a long side 751, a first short side 752, a second short side 753, a third short side 754, and a fourth short side 755. The main part 75 defines an accommodation space 750 inside, and the space 750 has an approximately U-shaped cross-section when seen in the direction of Y.

The first guide part 741 is disposed to the second flange 202 located on the second short side 753, and is located opposite from the main part 75 through the second flange 202.

The second guide part 742 is disposed to the second flange 202 located on the third short side 754, and is located opposite from the main part 75 through the second flange 202.

The first guide part 741 and the second guide part 742 define a first guide passage 743 and a second guide passage 744, respectively. The guide passage 743, 744 communicates with the accommodation space 750. The first intercooler 641 has a first main part 643 and a first protrusion 645.

The main part 643 is accommodated in the accommodation space 750 of the surge tank 74, and is located adjacent to the first short side 752 and the second short side 753. The protrusion 645 protrudes from the main part 643 into the guide passage 743.

The first intercooler 641 has a first supply port 647a, a first outlet port 647b, and a first refrigerant passage 647 that connects the ports 647a, 647b with each other. The first supply port 647a and the first outlet port 647b are projected outward from the main part 75 via the hole 701 and the hole 702 defined in the first short side 752, respectively.

The second intercooler 642 has a second main part 644 and a second protrusion 646. The main part 644 is accommodated in the accommodation space 750 of the surge tank 74, and is located adjacent to the third short side 754 and the fourth short side 755. The protrusion 646 protrudes from the main part 644 into the guide passage 744.

The second intercooler 642 has a first supply port 648a, a second outlet port 648b, and a second refrigerant passage 648 that connects the ports 648a, 648b with each other. The second supply port 648a and the second outlet port 648b are projected outward from the main part 75 via the hole 703 and the hole 704 defined in the fourth short side 755, respectively.

In the fourth embodiment, the first intercooler 641 and the second intercooler 642 have a first air passage 614a and a second air passage 614b extending in the direction of X. The first air passage 614a is located on an upper side in the direction of Y, and the second air passage 614b is located on a lower side in the direction of Y. A passage area of the first air passage 614a is made larger than that of the second air passage 614b.

In the fourth embodiment, the cylinder head 32 has a first recess 341 and a second recess 342 on an end surface opposing to the surge tank 74. Two of the four intake ports 311 open in a bottom 343 of the first recess 341, and the other two of the four intake ports 311 open in a bottom 344 of the second recess 342.

When the cylinder head 32 and the surge tank 74 are connected with each other, the first guide part 741 is fitted with the first recess 341, and the second guide part 742 is fitted with the second recess 342. At this time, the first guide part 743 communicates with the two intake ports 311 opened in the bottom 343, and the second guide part 744 communicates with the two intake ports 311 opened in the bottom 344.

Therefore, the intake air cooled by the first intercooler 641 and the second intercooler 642 is supplied to the intake ports 311.

According to the fourth embodiment, the passage area of the first air passage 614a is different from the passage area of the second air passage 614b in the first intercooler 641 and the second intercooler 642. The first air passage 614a is located upper side from the second air passage 614b in the direction of Y. The passage area of the first air passage 614a is larger than the passage area of the second air passage 614b. Therefore, an amount of the intake air passing through the first air passage 614a is larger than an amount of the intake air passing through the second air passage 614b. Thus, tumble flow of the intake air can be generated in the combustion chamber 313.

Fifth Embodiment

An air intake device 25 according to a fifth embodiment will be described with reference to FIGS. 7 and 8. In the fifth embodiment, approximately the same component as the first embodiment has the same reference numeral, and the redundant explanation is omitted.

Figure 7:
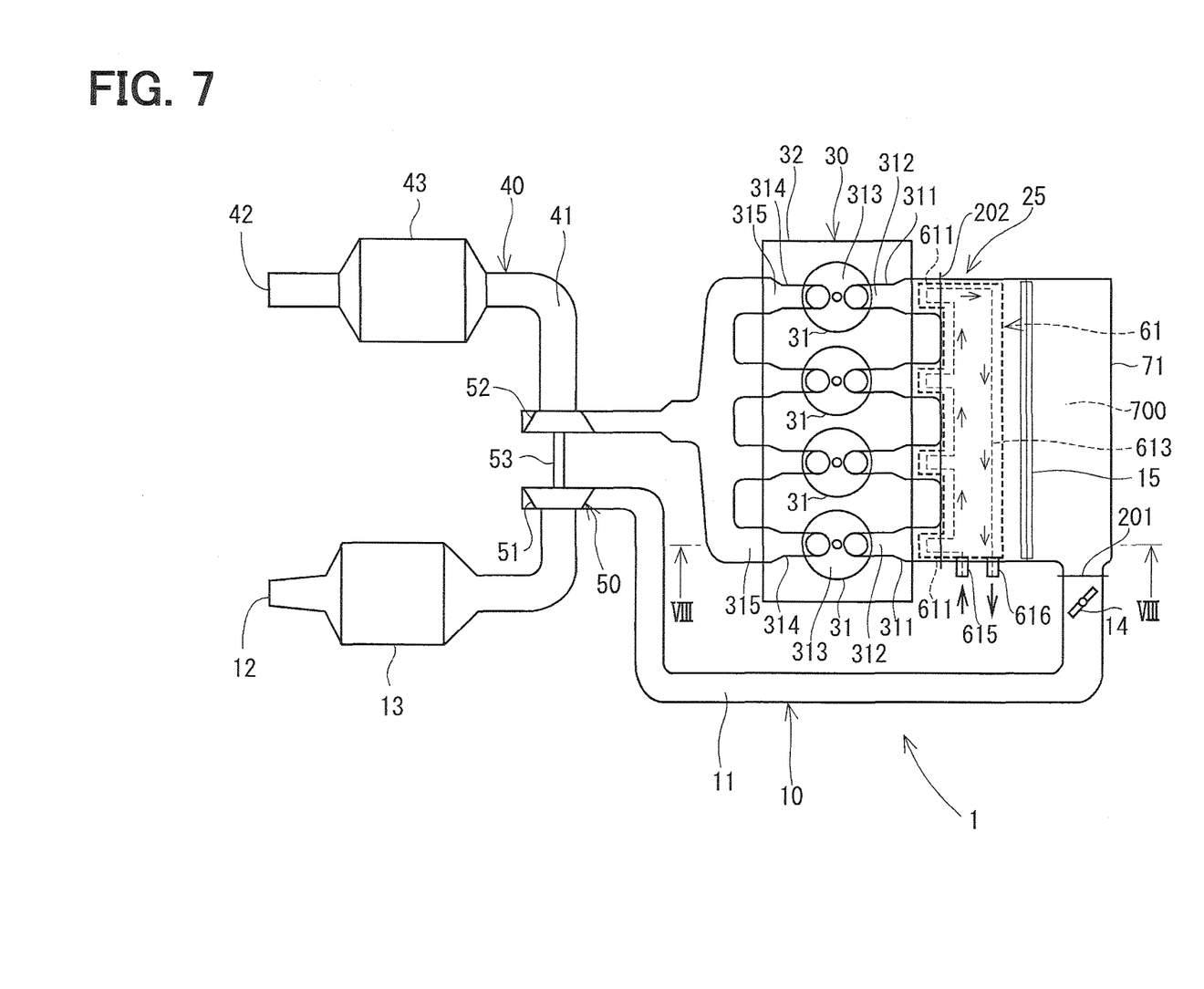
FIG. 7 is a schematic view illustrating an air intake system including an air intake device according to a fifth embodiment.

As shown in FIG. 7, a tumble control valve 15 is arranged in the surge tank 71 of the air intake device 25, and is used commonly for the four cylinders. The tumble control valve 15 is located opposite from the intake valve 317 through the intercooler 61.

Figure 8:
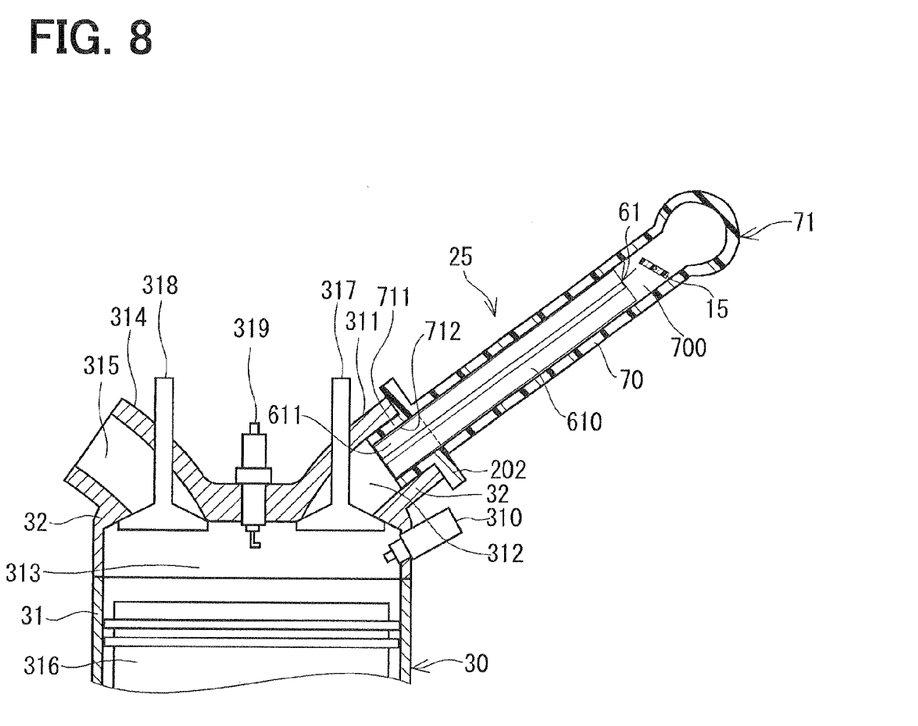
FIG. 8 is a sectional view taken along ling VIII-VIII of FIG. 7.

As shown in FIG. 8, an upper opening between the tank 71 and the valve 15 is set larger than a lower opening between the tank 71 and the valve 15. Therefore, the amount of the intake air passing on the upper side of the valve 15 is larger than the amount of the intake air passing on the lower side of the valve 15. Thus, tumble flow can be generated.

Other Embodiments

In the above embodiments, the cylinder head has the four intake ports. Alternatively, the number of the intake ports may be three or less, or five or more. The number of the intake ports may be one.

The shape of the surge tank is not limited to the rectangle. Alternatively, the shape of the surge tank may be other shape such as triangle.

The number of the tumble control valve is not limited to one, and may be two or more. The tumble control valve may be constructed by a throttle valve.

The passage area may be changed in the direction of Z, instead of the direction of Y.

Such changes and modifications are to be understood as being within the scope of the present disclosure as defined by the appended claims.

What is claimed is:

1. An air intake device that is connected to a cylinder head of an engine, the cylinder head including an intake port that accommodates an intake valve, the air intake device comprising:
    a surge tank having
        a main part defining an accommodation space that communicates with an intake passage of the intake port, and
        a connector connected to the cylinder head;
    a cooler accommodated in the accommodation space, the cooler having a refrigerant passage through which refrigerant is configured to flow and an air passage through which intake air is configured to flow, the cooler being configured to cool the intake air using the refrigerant, wherein the cooler has a protrusion protruding from the connector toward the intake valve; and
    a flow rate controller that controls an amount of the intake air flowing through the intake passage, the flow rate controller comprising a tumble control valve configured to generate a tumble flow or a swirl control valve configured to generate a swirl flow, wherein the flow rate controller is located opposite from the intake valve through the cooler.

2. The air intake device according to claim 1, wherein the protrusion is one of a plurality of protrusions.

3. The air intake device according to claim 1, wherein the cooler is one of a plurality of coolers.

4. The air intake device according to claim 1, wherein the refrigerant passage extends to an end of the cooler opposing to the intake valve.

5. The air intake device according to claim 1, wherein the refrigerant passage has a forward passage and a backward passage, wherein refrigerant passage is configured so that refrigerant flows toward the intake valve in the forward passage and flows away from the intake valve in the backward passage.

6. The air intake device according to claim 1, wherein the air passage of the cooler is separated into a first part and a second part in a direction perpendicular to a flowing direction of the intake air, and
    the first part has a first passage area larger than a second passage area of the second part.

7. The intake device according to claim 1, further comprising a throttle valve upstream of the flow rate controller.

8. The intake device according to claim 7, wherein the throttle valve is upstream of the surge tank.

\* \* \* \* \*